United States Patent
Wang et al.

(10) Patent No.: US 12,449,501 B2
(45) Date of Patent: Oct. 21, 2025

(54) INDOOR POSITIONING METHOD AND DEVICE

(71) Applicant: Huawei Technologies Co., Ltd., Shenzhen (CN)

(72) Inventors: Wei Wang, Singapore (SG); Zichen Xie, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 393 days.

(21) Appl. No.: 18/159,789

(22) Filed: Jan. 26, 2023

(65) Prior Publication Data

US 2023/0168334 A1 Jun. 1, 2023

Related U.S. Application Data

(63) Continuation of application No. PCT/CN2020/105133, filed on Jul. 28, 2020.

(51) Int. Cl.
G01S 5/02 (2010.01)
H04W 64/00 (2009.01)

(52) U.S. Cl.
CPC .......... *G01S 5/0218* (2020.05); *G01S 5/0284* (2013.01); *H04W 64/006* (2013.01)

(58) Field of Classification Search
None
See application file for complete search history.

(56) References Cited

U.S. PATENT DOCUMENTS

| | | | |
|---|---|---|---|
| 2009/0164067 A1* | 6/2009 | Whitehead | G01S 5/0247 701/41 |
| 2014/0324291 A1* | 10/2014 | Jones | G01S 19/44 701/41 |
| 2015/0160329 A1 | 6/2015 | Ranki et al. | |
| 2017/0219859 A1 | 8/2017 | Christophy et al. | |
| 2020/0178201 A1 | 6/2020 | Pan et al. | |

FOREIGN PATENT DOCUMENTS

| | | | | |
|---|---|---|---|---|
| CN | 107389028 A | * | 11/2017 | G01B 21/00 |
| CN | 108051778 A | * | 5/2018 | |
| CN | 108474859 A | | 8/2018 | |
| WO | 2019221747 A1 | | 11/2019 | |

* cited by examiner

*Primary Examiner* — Adolf Dsouza
(74) *Attorney, Agent, or Firm* — Conley Rose, P.C.

(57) ABSTRACT

An indoor positioning method includes: receiving a first measurement parameter obtained by a first device by measuring a second device in a first coordinate system, where the first measurement parameter includes a first angle and a first distance, the first angle is an angle of the second device in the first coordinate system, and the first distance is a distance of the second device relative to an origin of coordinates of the first coordinate system; determining a first spatial position of the second device in the first coordinate system based on the first angle and the first distance; and determining a spatial position of the second device in a geodetic coordinate system based on the first spatial position and a conversion relationship between the first coordinate system and the geodetic coordinate system.

20 Claims, 16 Drawing Sheets

Receive a second measurement parameter sent by the second device, where the second measurement parameter is obtained by the second device by measuring a third device in an aligned second coordinate system, and the second measurement parameter includes a second angle and a second distance ⟋ 104

Determine a second spatial position of the third device in the aligned second coordinate system based on the second angle and the second distance ⟋ 105

Determine a third spatial position of the third device in the first coordinate system based on the second spatial position ⟋ 106

FIG. 6

Trilateration

Triangulation

RSSI-based fingerprinting

INDOOR POSITIONING METHOD AND DEVICE

CROSS-REFERENCE TO RELATED APPLICATIONS

This application is a continuation application of International Patent Application No. PCT/CN2020/105133 filed on Jul. 28, 2020, the disclosure of which is hereby incorporated by reference in its entirety.

TECHNICAL FIELD

This application relates to the field of wireless positioning technologies, and in particular, to an indoor positioning method and device.

BACKGROUND

With the improvement of people's living standards, smart homes have gradually become popular in people's lives, and the industry is also vigorously promoting the evolution of related technologies to improve user experience of the smart homes. For example, following an all-scenario intelligence strategy proposed by HUAWEI, HUAWEI establishes partnerships with 200 enterprises through a HILINK ecosystem to comprehensively promote an upgrade of the smart home industry. Position information of a user or an item is an important part of a smart home. Accurately positioning of a user or an item can help improve user experience of the smart homes. For example, accurately locating positions of indoor furnishings helps a sweeping robot plan a reasonable sweeping route, thereby improving sweeping efficiency.

To provide accurate position information, a positioning system usually needs to set up infrastructure in advance. Nodes in the infrastructure are referred to as anchors. Their positions are fixed and known. By measuring attributes of a radio signal between each anchor and a mobile target, the positioning system can infer a position of the mobile target.

However, in a process of arranging anchors indoors, a position and an orientation of an anchor itself will directly affect accuracy of the positioning system. Therefore, professional persons skilled in the art are required to set up anchors to ensure accuracy of parameters such as a position and an orientation of an anchor, which is difficult to achieve in some local communities. In addition, even if anchors can be deployed indoors for homes in some cities, deploying and setting up the anchors in an indoor home environment still needs to consume significant human resources and costs due to a limited quantity of professional persons skilled in the art.

SUMMARY

This application provides an indoor positioning method and device, to implement indoor positioning and reduce labor costs. The following technical solutions are disclosed.

According to a first aspect, this application discloses an indoor positioning method, where the method includes receiving a first measurement parameter obtained by a first device by measuring a second device in a first coordinate system, determining a first spatial position of the second device in the first coordinate system based on a first angle and a first distance, and determining a spatial position of the second device in a geodetic coordinate system based on the first spatial position and a conversion relationship between the first coordinate system and the geodetic coordinate system.

The first coordinate system is established based on an antenna, used as an origin of coordinates, in an antenna array of the first device and a geometric structure of the first device. The first measurement parameter includes the first angle and the first distance, where the first angle is an angle of the second device in the first coordinate system, and the first distance is a distance of the second device relative to the origin of coordinates.

In the method, the first coordinate system is established by using the geometric structure of the first device, the angle and the distance of the indoor second device are measured by using the first coordinate system, and the spatial position of the second device in the geodetic coordinate system is determined based on the conversion relationship between the first coordinate system and the geodetic coordinate system, which is obtained in advance. The method implements automatic locating of a position of the indoor second device, and a relative position of the second device in the geodetic coordinate system can be accurately obtained without requiring professional persons skilled in the art to install and set up an anchor or being restricted by a change to an orientation of an antenna array due to a user's unintentional touch, thereby improving positioning accuracy.

In addition, the geometric structure of the first device includes a length, a width, and a height of the first device, and coordinate axes are established for the first coordinate system based on the length, the width, and the height of the first device. The first angle is an angle of an antenna array of the second device measured by the first device in the first coordinate system. In this implementation, the first coordinate system is established based on the length, the width, and the height of the first device, and a plane that includes the length and the width of the first device is likely parallel to a horizontal plane, and a z-axis of the first coordinate system is parallel to the height of the first device. Therefore, a coordinate system positioning operation can be simplified, and positioning efficiency can be improved.

With reference to the first aspect, in a possible implementation of the first aspect, the method further includes receiving a second measurement parameter obtained by the second device by measuring a third device in an aligned second coordinate system, determining a second spatial position of the third device in the aligned second coordinate system based on a second angle and a second distance, and determining a third spatial position of the third device in the first coordinate system based on the second spatial position.

Coordinate axis directions of the aligned second coordinate system are consistent with coordinate axis directions of the first coordinate system. The second measurement parameter includes the second angle and the second distance, where the second angle is an angle of the third device in the aligned second coordinate system, and the second distance is a distance of the third device relative to an origin of coordinates of the aligned second coordinate system.

With reference to the first aspect, in another possible implementation of the first aspect, before receiving a second measurement parameter from the second device, the method further includes obtaining the first angle and a third angle, where the third angle is an angle of the first device in the second coordinate system, and the second coordinate system is established based on an antenna, used as the origin of coordinates, in an antenna array of the second device and a geometric structure of the second device, determining a target angle based on the first angle and the third angle, and rotating a first plane of the second coordinate system by the target angle in a horizontal direction to obtain the aligned second coordinate system, where the first plane includes an x-axis and a y-axis of the second coordinate system.

In this implementation, a server may obtain a relative orientation and a target angle of one device in a coordinate system of another device through angle measurement performed by the devices on each other, align the coordinate system of the other device based on the target angle, and then measure an angle and a distance of still another device by using the aligned coordinate system. Then, a spatial position of the still another device in a basic coordinate system is obtained. Finally, a spatial position of the still another device in the geodetic coordinate system is accurately located by using a conversion relationship between the basic coordinate system and the geodetic coordinate system. In this way, the following problem is avoided. A direction and an orientation of an anchor change due to manual setup of the anchor and artificial reasons, thereby affecting positioning accuracy.

Optionally, determining a target angle based on the first angle and the third angle includes determining the target angle based on a first relational expression, where the first relational expression is $\delta 1 = \theta 1 - \theta 3 - 180°$.

In the first relational expression, $\delta 1$ is the target angle, $\theta 1$ is the first angle, and $\theta 3$ is the third angle.

With reference to the first aspect, in still another possible implementation of the first aspect, the method further includes determining a spatial position of the third device in the geodetic coordinate system based on the third spatial position of the third device and the conversion relationship between the first coordinate system and the geodetic coordinate system.

In this implementation, a positioning server may periodically obtain a measurement parameter reported by each device, such as an angle and a distance, thus obtain a latest relative orientation and a latest relative position of each device regarding another device, and then convert the latest relative orientation and the latest relative position into an orientation and a position in the geodetic coordinate system. In this way, accurate position locating and orientation maintenance are implemented for each indoor device, manual setup and deployment of an anchor are avoided, anchor deployment costs are reduced, and human resources and costs are saved.

With reference to the first aspect, in still another possible implementation of the first aspect, the method further includes obtaining a spatial position of the first device in the geodetic coordinate system based on the conversion relationship between the first coordinate system and the geodetic coordinate system, and performing positioning on a mobile target by using the spatial positions of the first device, the second device, and the third device in the geodetic coordinate system, and obtaining a spatial position of the mobile target in the geodetic coordinate system.

Information such as the first coordinate system, the aligned second coordinate system, the geodetic coordinate system, the first measurement parameter, and the second measurement parameter, and geometric structures of the first device, the second device, and the third device may both be automatically displayed in a three-dimensional model diagram of a home and displayed on a terminal device of a user, thereby providing the user with intuitive and visual position information. In addition, output (that is, a position of the mobile target) of a positioning system may also be displayed, thereby improving user satisfaction.

The method reduces technical difficulty and labor costs of anchor deployment, and improves robustness of the positioning system.

According to a second aspect, this application discloses an indoor positioning device, where the device includes a communication circuit configured to receive a first measurement parameter obtained by a first device by measuring a second device in a first coordinate system, and a processing circuit configured to determine a first spatial position of the second device in the first coordinate system based on a first angle and a first distance, and determine a spatial position of the second device in a geodetic coordinate system based on the first spatial position and a conversion relationship between the first coordinate system and the geodetic coordinate system.

The first coordinate system is established based on an antenna, used as an origin of coordinates, in an antenna array of the first device and a geometric structure of the first device. The first measurement parameter includes the first angle and the first distance, where the first angle is an angle of the second device in the first coordinate system, and the first distance is a distance of the second device relative to the origin of coordinates.

Optionally, the geometric structure of the first device includes a length, a width, and a height of the first device, and coordinate axes are established for the first coordinate system based on the length, the width, and the height of the first device. In addition, the first angle is an angle of an antenna array of the second device measured by the first device in the first coordinate system.

With reference to the second aspect, in a possible implementation of the second aspect, the communication circuit is further configured to receive a second measurement parameter obtained by the second device by measuring a third device in an aligned second coordinate system, where coordinate axis directions of the aligned second coordinate system are consistent with coordinate axis directions of the first coordinate system, and the second measurement parameter includes a second angle and a second distance, where the second angle is an angle of the third device in the aligned second coordinate system, and the second distance is a distance of the third device relative to an origin of coordinates of the aligned second coordinate system.

The processing circuit is further configured to determine a second spatial position of the third device in the aligned second coordinate system based on the second angle and the second distance, and determine a third spatial position of the third device in the first coordinate system based on the second spatial position.

With reference to the second aspect, in another possible implementation of the second aspect, the processing circuit is further configured to, before the communication circuit receives the second measurement parameter, obtain the first angle and a third angle, determine a target angle based on the first angle and the third angle, and rotate a first plane of the second coordinate system by the target angle in a horizontal direction to obtain the aligned second coordinate system.

The third angle is an angle of the first device in the second coordinate system, the second coordinate system is established based on an antenna, used as the origin of coordinates, in an antenna array of the second device and a geometric structure of the second device, and the first plane includes an x-axis and a y-axis of the second coordinate system.

Further, the processing circuit is further configured to determine the target angle based on a first relational expression, where the first relational expression is $\delta 1 = \theta 1 - \theta 3 -$ 180°. In the first relational expression, δ1 is the target angle, θ1 is the first angle, and θ3 is the third angle.

With reference to the second aspect, in still another possible implementation of the second aspect, the processing circuit is further configured to determine a spatial position of the third device in the geodetic coordinate system based on the third spatial position of the third device and the conversion relationship between the first coordinate system and the geodetic coordinate system.

With reference to the second aspect, in still another possible implementation of the second aspect, the processing circuit is further configured to obtain a spatial position of the first device in the geodetic coordinate system based on the conversion relationship between the first coordinate system and the geodetic coordinate system, and perform positioning on a mobile target by using the spatial positions of the first device, the second device, and the third device in the geodetic coordinate system, and obtain a spatial position of the mobile target in the geodetic coordinate system.

According to a third aspect, this application further provides a device, where the device may be a home appliance device, such as a first device. The first device includes a communication circuit, a processing chip, an antenna array, and a memory.

The processing chip is configured to obtain a first measurement parameter, where the first measurement parameter includes a first angle and a first distance, the first angle is an angle of a second device in a first coordinate system, the first distance is a distance of the second device relative to an origin of coordinates, and the first coordinate system is established based on an antenna, used as the origin of coordinates, in an antenna array of the first device and a geometric structure of the first device.

The communication circuit is configured to send the first measurement parameter.

With reference to the third aspect, in a possible implementation of the third aspect, the processing chip is further configured to obtain the first angle and a third angle, determine a target angle based on the first angle and the third angle, and rotate a first plane of a second coordinate system by the target angle in a horizontal direction to obtain the aligned second coordinate system, where the first plane includes an x-axis and a y-axis of the second coordinate system.

The communication circuit is further configured to send the aligned second coordinate system.

When the target angle is δ1, the first angle is θ1, and the third angle is θ3, it is determined that the target angle is δ1=θ1−θ3−180°.

Optionally, with reference to the third aspect, in another possible implementation of the third aspect, the processing chip is further configured to obtain the first angle and a third angle, and the communication circuit is further configured to send the first angle and the third angle.

Optionally, in a possible implementation, the first device includes a printed circuit board (PCB) board, and the communication circuit, the processing chip, the antenna array, and the memory are all integrated into the PCB board.

Optionally, the processing chip may be a processor, for example, a central processing unit (CPU).

It should be understood that the home appliance device may further be the second device or a third device, and the home appliance device includes but is not limited to a television (TV), a sound box, and an air conditioner.

When the device is the second device, the processing chip is configured to obtain a second measurement parameter, where the second measurement parameter includes a second angle and a second distance, the second angle is an angle of the third device in the aligned second coordinate system, coordinate axis directions of the aligned second coordinate system are consistent with coordinate axis directions of the first coordinate system, and the second distance is a distance of the third device relative to an origin of coordinates of the aligned second coordinate system, and the communication circuit is further configured to send the second measurement parameter.

According to a fourth aspect, this application further provides a communication device, including a processor and a memory, where the memory is coupled to the processor, the memory is configured to store computer program instructions, and the processor is configured to execute the instructions stored in the memory, so that the communication device performs the method according to the first aspect and the implementations of the first aspect.

According to a fifth aspect, this application further provides a computer readable storage medium. The storage medium stores instructions, so that when the instructions are run on a computer or a processor, the instructions may be used to perform the method according to the first aspect and the implementations of the first aspect.

In addition, this application further provides a computer program product. The computer program product includes computer instructions. When the instructions are run on a computer or a processor, the method according to the first aspect and the implementations of the first aspect may be implemented.

According to a sixth aspect, this application further provides a wireless positioning system. The system includes a communication device and at least three home appliance devices. The communication device may be the device described in the second aspect or the fourth aspect, and may implement the method according to the first aspect and the implementations of the first aspect. The home appliance device may be the device described in the third aspect, including the functions described in the third aspect and the implementations of the third aspect.

It should be noted that beneficial effects corresponding to the technical solutions provided in the implementations of the second aspect to the implementations of the sixth aspect are the same as beneficial effects of the first aspect and the implementations of the first aspect. For details, refer to the description of the beneficial effects of the first aspect and the implementations of the first aspect. Details are not described herein again.

BRIEF DESCRIPTION OF DRAWINGS

FIG. 6 is a flowchart of another indoor positioning method according to an embodiment of this application;

DESCRIPTION OF EMBODIMENTS

The following describes the technical solutions of this application with reference to embodiments and accompanying drawings of this application. For ease of understanding the technical solutions provided in the embodiments of this application, a technical scenario to which the technical solutions of this application are applicable is first described.

Figure 1:
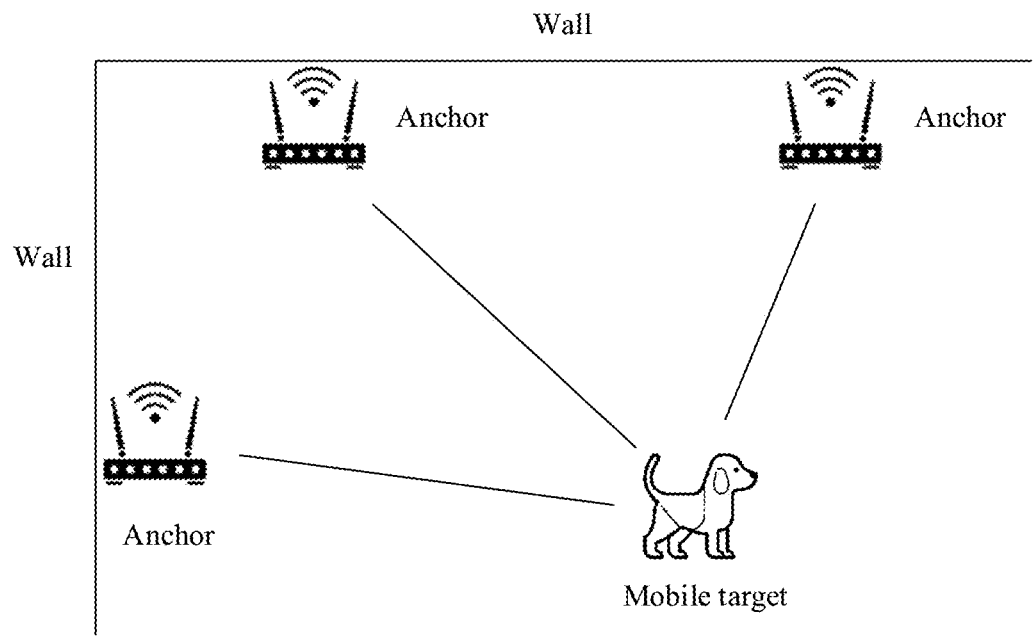
FIG. 1 is a schematic diagram of a structure of an indoor positioning system according to an embodiment of this application.

The technical solutions of this application may be applied to an indoor positioning scenario. As shown in FIG. 1, an indoor positioning system includes three anchors and a mobile target. In addition, a server or more other anchors may further be included, which is not limited in the embodiments.

Each anchor has functions of direction finding and ranging using a radio signal. For example, each anchor may include a processing module or processing chip, and a communication module. The processing module is configured to process a radio signal received or sent by the communication module, determine information such as a distance between the anchor and another anchor and a direction (or a relative angle) of the anchor regarding the other anchor based on the radio signal, and send the information to the server of the positioning system through the communication module. The communication module is configured to implement communication between the anchor and the server, or between anchors. For example, the processing module reports a measured distance between the anchor and the mobile target, and/or a measured relative angle of the anchor regarding the mobile target to the server through the communication module.

The server may receive measurement information reported by each anchor, and perform positioning calculation on the mobile target based on the information. A specific positioning calculation manner is not limited in this application.

In addition, to support a direction finding technology, each anchor further includes an antenna array, and the antenna array includes at least two antennas. In the embodiments of this application, each antenna is considered as a point, and an orientation of a specific antenna is not considered separately, but an orientation of the entire antenna array is considered. For example, whether an orientation of an antenna array of an anchor is parallel to an indoor wall surface is considered. The orientation or the orientation of the antenna array may be represented by using an antenna array coordinate system of the anchor. Optionally, a position of each antenna may also be represented by using the antenna array coordinate system.

Optionally, the antenna array coordinate system of the anchor is also referred to as an anchor coordinate system.

An angle value of each anchor regarding another anchor or an angle value of each anchor regarding the mobile target, which is measured by each anchor, may both be represented by using the antenna array coordinate system.

In addition, the technical solutions in the embodiments of this application may be further applied to various wireless technologies that can support ranging and direction finding, such as BLUETOOTH, WI-FI, ultra wideband (UWB), and ZIGBEE.

In the embodiments of this application, an anchor is set up based on an attribute of a home appliance device. Further, in an indoor home scenario, a home appliance device includes the following attributes.

(1) A position and an orientation of a home appliance are usually fixed, such as a TV hanging on a wall, a refrigerator at a corner of a wall, and an air conditioner hanging on a wall. In addition, although some home appliances can be moved, most of the time their positions and orientations are still fixed, such as a sound box and a fan.

(2) Home appliances are basically powered by a power supply, usually connected to the power supply by using a power plug.

(3) A volume of a home appliance is usually much greater than a volume of an anchor, so there is enough space for the anchor to be installed in the home appliance.

Based on the foregoing attributes of a home appliance, the home appliance can provide a favorable setup platform for an anchor in the indoor positioning system, and can also continuously provide power supply for the anchor.

In the embodiments of this application, an anchor is disposed in an indoor home appliance device. Further, the processing module and the communication module of each anchor are integrated into a processor or a processing chip of a home appliance device. In this way, the processor or the processing chip of the home appliance device is used to implement a positioning function of the anchor.

Figure 2A:
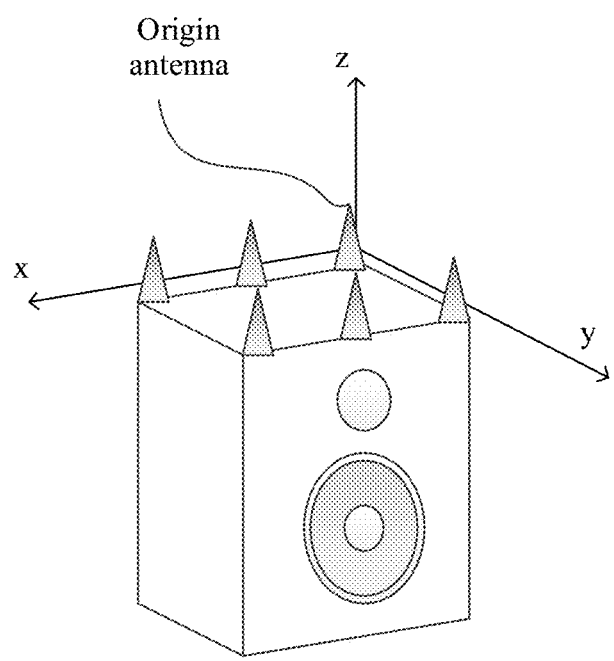
FIG. 2A is a schematic diagram of an anchor coordinate system established based on a sound box according to an embodiment of this application.

For example, an implementation includes setting an anchor coordinate system, which may also be referred to as a "first coordinate system", based on a geometric structure of a home appliance device. For example, directions of a length, a width, and a height of a home appliance device are set to be x-, y-, and z-axes of the first coordinate system respectively. As shown in FIG. 2A, an anchor is set up on a sound box. An antenna array of the anchor may be located on the top of the sound box, and the antenna array is a 3×2 matrix antenna array. A connection direction of three antennas in each row is the x-axis of the anchor coordinate system, a connection direction of two antennas in each column is the y-axis of the first coordinate system, and a direction perpendicular to the x-axis and the y-axis is the z-axis. The x-, y-, and z-axes of the anchor coordinate system are parallel to a length, a width, and a height of the sound box respectively. In addition, an origin of coordinates of the first coordinate system may be arbitrarily set. For example, a position of a specific antenna in the antenna array is used as the origin of coordinates of the first coordinate system. In FIG. 2A, the origin of coordinates is a position of an antenna at the upper right corner of the antenna array, and the antenna may also be referred to as an "origin antenna".

Figure 2B:
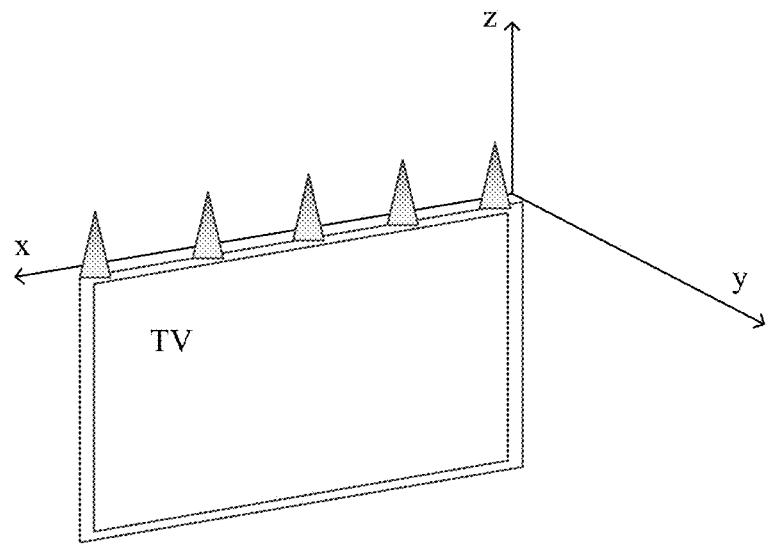
FIG. 2B is a schematic diagram of an anchor coordinate system established based on a TV according to an embodiment of this application.

For another example, a TV is used as an example of the home appliance device. As shown in FIG. 2B, an anchor including a 5×1 antenna array is installed on the top of the TV, and directions of a length, a width, and a height of the TV are set to be the x-, y-, and z-axes of the anchor coordinate system. In addition, an antenna on a rightmost side of the antenna array is the origin antenna, and a position of the origin antenna is the origin of coordinates of the anchor coordinate system.

It should be understood that, in addition to the sound box and the TV that are used as examples, the home appliance device may also be a washing machine, a refrigerator, an air conditioner, and the like. Examples are not listed in this embodiment of this application one by one.

In this embodiment, two correspondences included in a home appliance device including an anchor are described above. A first correspondence is a relationship between a placement manner of each antenna in an antenna array of the anchor and an anchor coordinate system. A second correspondence is a relationship between the anchor coordinate system and a geometry of the home appliance device in which the anchor is located. Further, in the first correspondence, each antenna may measure a phase of a signal received by the antenna from another device, and then a processing module or a processor processes the phase values to obtain an angle value, and then performs angle of arrival (AoA) positioning calculation by using the angle value, where the angle value is based on the anchor coordinate system that is established for the current anchor and that is used as a reference. Therefore, for different anchor coordinate systems, corresponding angle values are different. In the second correspondence, conversion between the anchor coordinate system and a geodetic coordinate system can be implemented by using a geometric structure of the home appliance as an intermediate bridge.

Figure 3A:
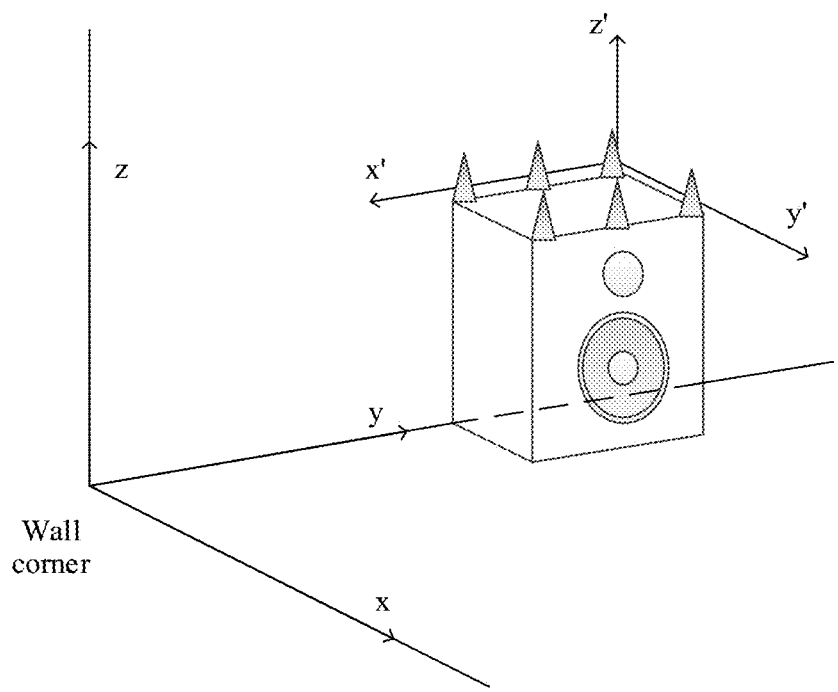
FIG. 3A is a schematic diagram of an anchor coordinate system and a geodetic coordinate system according to an embodiment of this application.

Further, similar to an outdoor positioning system, a geodetic coordinate system, also referred to as a "map coordinate system", needs to be established in the indoor positioning system. A coordinate axis of the geodetic coordinate system may be set based on a building structure inside a house. For ease of calculation, an indoor room, such as a living room, may be used. Three directions included in a wall corner of the living room are set to be x-, y-, and z-axes of the geodetic coordinate system, and a point at the wall corner is an origin of coordinates of the geodetic coordinate system. As shown in FIG. 3A, x, y, and z represent the three coordinate axes of the geodetic coordinate system, and x', y', and z' represent three coordinate axes of an anchor coordinate system established based on a geometric structure of a sound box device.

Figure 3B:
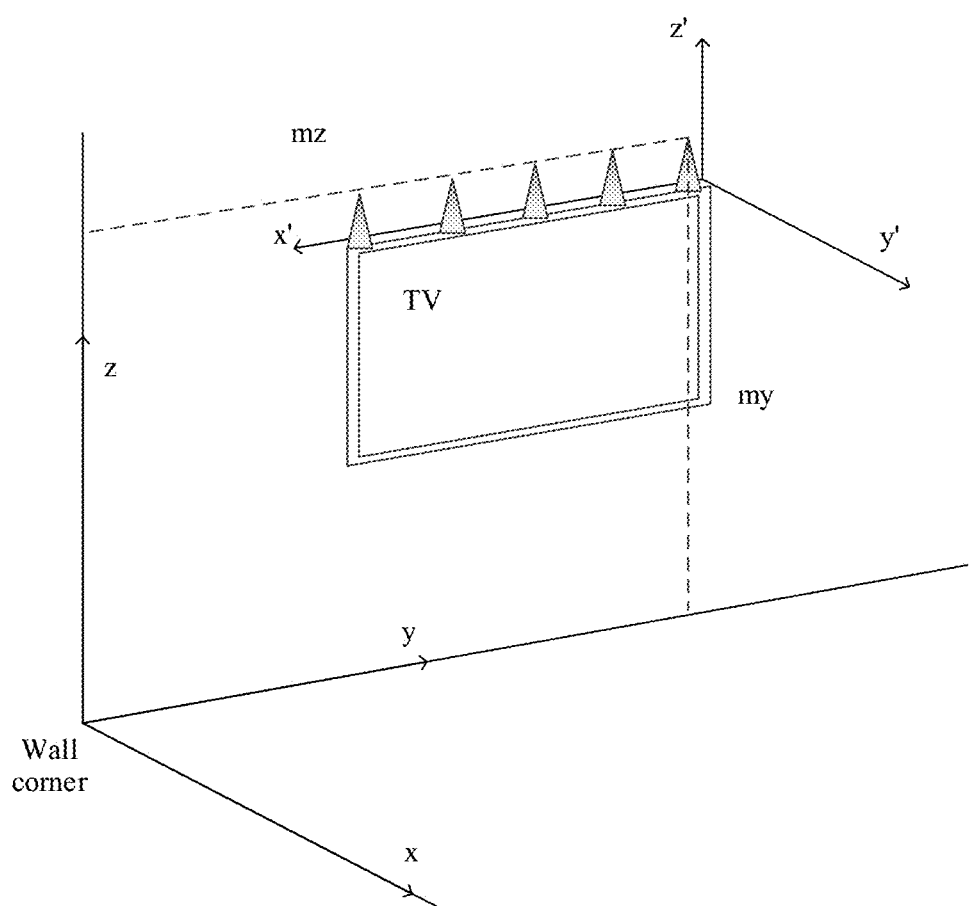
FIG. 3B is a schematic diagram of another anchor coordinate system and a geodetic coordinate system according to an embodiment of this application.

In another example, as shown in FIG. 3B, the geodetic coordinate system is a coordinate system formed by using x-, y-, and z-axes at a wall corner, and an anchor coordinate system established based on a TV is a coordinate system represented by x'-, y'-, and z'-axes. In addition, the TV is hung on a wall surface. Therefore, a plane that includes the y-axis and the z-axis of the geodetic coordinate system and a plane that includes the x'-axis and the z'-axis of the anchor coordinate system are the same plane, which can simplify calculation in a coordinate system conversion process.

In this embodiment, a positioning server may obtain a conversion relationship between the anchor coordinate system and the geodetic coordinate system based on the anchor coordinate system and a position and an orientation of the TV in the geodetic coordinate system. For example, in FIG. 3B, coordinates of an origin antenna of the anchor coordinate system in the geodetic coordinate system are (0, mz, my), where my is a distance from the origin antenna to the y-axis of the geodetic coordinate system, and $m_z$ is a distance from the origin antenna to the z-axis. Then, based on the conversion relationship between the anchor coordinate system and the geodetic coordinate system, an AoA measured in the anchor coordinate system is converted into an angle in the geodetic coordinate system for subsequent positioning calculation of the AoA.

It should be noted that, in this embodiment, the anchor is disposed in the processor or the processing chip of the home appliance device. Therefore, the anchor coordinate system is a coordinate system established based on the geometric structure of the home appliance device, for example, the first coordinate system, a second coordinate system, and a third coordinate system.

The following describes in detail the technical solutions provided in the embodiments of this application.

Figure 4:
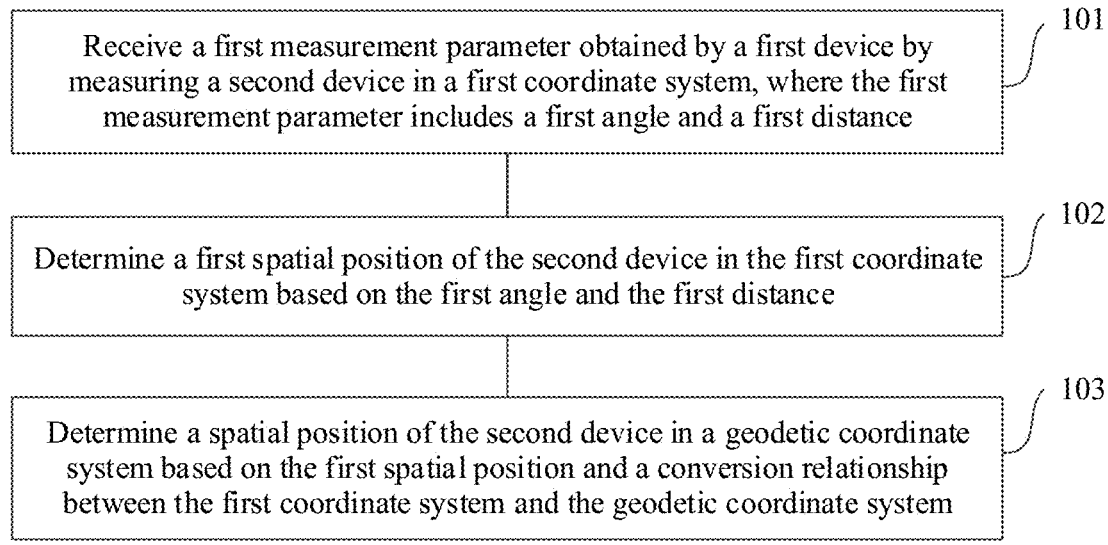
FIG. 4 is a flowchart of an indoor positioning method according to an embodiment of this application.

To reduce technical difficulty in anchor deployment, reduce costs and overheads, and improve robustness of a positioning system, an embodiment of this application provides an indoor positioning method. The method is applied to the foregoing indoor positioning scenario, and may be executed by a positioning server. As shown in FIG. 4, the method includes the following steps.

101: Receive a first measurement parameter obtained by a first device by measuring a second device in a first coordinate system, where the first measurement parameter includes a first angle and a first distance.

The first device is a home appliance device. The first coordinate system is established based on a geometric structure of the home appliance device. The first coordinate system uses an antenna in an antenna array of the first device as an origin of coordinates, and uses directions of a length, a width, and a height of the first device as x-, y-, and z-axes of the first coordinate system. The first angle is an angle of the second device in the first coordinate system measured by the first device, and the second device may be another indoor home appliance device. The first distance is a distance of the second device relative to the origin of coordinates of the first coordinate system measured by the first device.

Figure 5A:
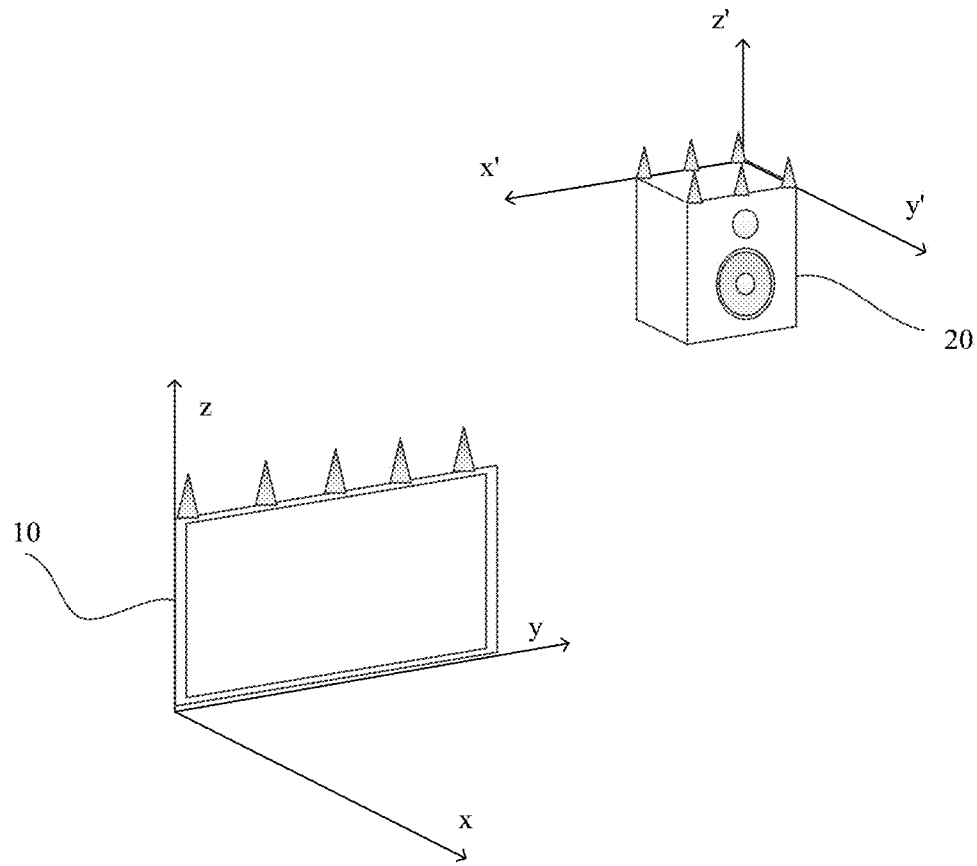
FIG. 5A is a schematic diagram of a first coordinate system and a second coordinate system according to an embodiment of this application.

For example, as shown in FIG. 5A, the first device is a TV 10, and the second device is a sound box 20. The TV 10 includes a processing chip and a first antenna array. The sound box 20 includes a processing chip and a second antenna array. The processing chip of the TV 10 establishes the first coordinate system based on directions of a length, a width, and a height of the TV 10 and a position of an antenna in the first antenna array, where the three coordinate axes of the first coordinate system are respectively represented as x, y, and z, and the origin of coordinates of the first coordinate system is the first antenna in the first row of the first antenna array. Similarly, the processing chip of the sound box 20 establishes a second coordinate system based on a length, a width, and a height of the sound box 20 and a position of an antenna in the second antenna array, where three coordinate axes of the second coordinate system are respectively represented as x', y', and z', and an origin of coordinates of the second coordinate system is the third antenna in the first row of the second antenna array. In addition, the z'-axis of the second coordinate system is perpendicular to a horizontal plane, and a plane that includes the x'-axis and the y'-axis is parallel to the horizontal plane, where the horizontal plane may be understood as an earth surface.

In addition, a plane that includes the x-axis and the y-axis of the first coordinate system is also parallel to the horizontal plane.

Figure 5B:
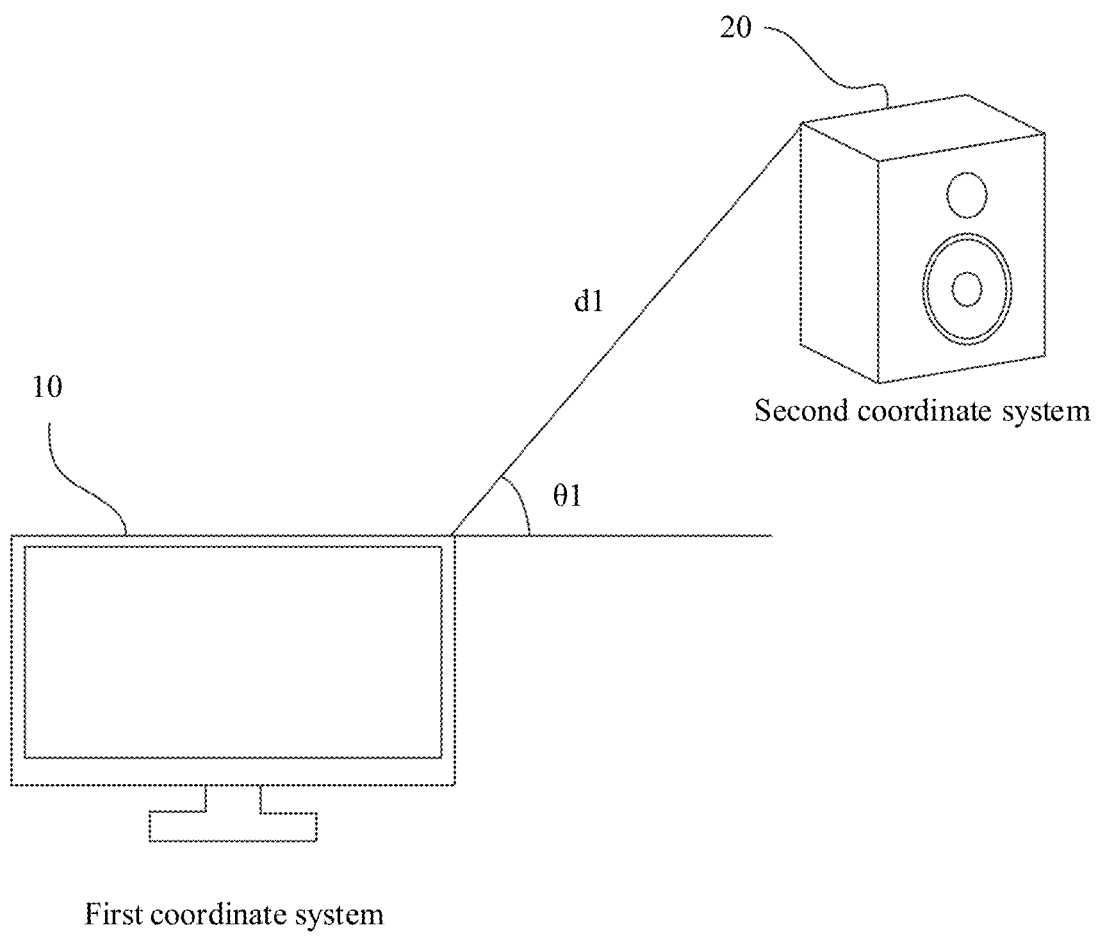
FIG. 5B is a schematic diagram of a position relationship between a TV and a sound box according to an embodiment of this application.

As shown in FIG. 5B, the first angle is an angle of the second antenna array of the sound box 20 in the first coordinate system measured by the first device, namely, the TV 10. It may be understood that a size (at a centimeter level) of a spacing between antennas in an antenna array is far less than a distance (at a meter level) between home appliance devices, and therefore an antenna array of a device is approximately considered as a point in this embodiment of this application. In addition, angles of all antennas in the second antenna array in the first coordinate system are approximately the same, and therefore the first angle can be obtained by measuring an angle of only one antenna, such as an origin antenna, in the second antenna array in the first coordinate system.

Optionally, the first angle is represented as $\theta 1$, and the first distance is represented as d1.

It should be noted that, when a home appliance device is delivered from a factory, a processing chip and an antenna array are already installed on a PCB of each home appliance device, a coordinate system of the home appliance device is established, and information such as an orientation of the antenna array and a position of an origin antenna in the antenna array is also determined on each PCB board. When purchasing a home appliance device, a user may obtain a coordinate system of the home appliance device and related information of the coordinate system that are provided by a home appliance device manufacturer.

102: Determine a first spatial position of the second device in the first coordinate system based on the first angle and the first distance.

For example, a position of the sound box 20 in the first coordinate system is (x1, y1), and a first spatial position of the sound box 20 in the first coordinate system is obtained with reference to the first distance d1, where the first spatial position is (x1, y1, 0).

103: Determine a spatial position of the second device in a geodetic coordinate system based on the first spatial position and a conversion relationship between the first coordinate system and the geodetic coordinate system.

Further, the spatial position of the second device in the geodetic coordinate system is determined based on the first spatial position of the second device in the first coordinate system and the conversion relationship between the first coordinate system and the geodetic coordinate system.

The conversion relationship between the first coordinate system and the geodetic coordinate system may be obtained in advance and stored in the positioning server. Further, the positioning server obtains the conversion relationship between the first coordinate system and the geodetic coordinate system based on a position and an orientation of the first device in the first coordinate system and a position and an orientation of the first device in the geodetic coordinate system. For an example obtaining process, refer to related descriptions of FIG. 3A and FIG. 3B. Details are not described again in this embodiment.

It should be understood that, in this embodiment, the second coordinate system established by the second device may also be used as a basic coordinate system, and a position of the first device is represented by using the second coordinate system based on a conversion relationship between the second coordinate system and the geodetic coordinate system. A specific method is the same as a method in which a position of the second device is represented by using the first coordinate system in this embodiment. Details are not described again in this embodiment.

In the method provided in this embodiment, the first coordinate system is established by using the geometric structure of the first device, the angle and the distance of the indoor second device are measured by using the first coordinate system, and the spatial position of the second device in the geodetic coordinate system is determined based on the conversion relationship between the first coordinate system and the geodetic coordinate system, which is obtained in advance. The method implements automatic locating of a position of the indoor second device, and a relative position of the second device in the geodetic coordinate system can be accurately obtained without requiring professional persons skilled in the art to install and set up an anchor or being restricted by a change to an orientation of an antenna array due to a user's unintentional touch, thereby improving positioning accuracy.

Optionally, the method further includes performing positioning on an indoor third device. As shown in FIG. 6, the method includes the following steps.

104: Receive a second measurement parameter sent by the second device, where the second measurement parameter is obtained by the second device by measuring a third device in the aligned second coordinate system, and the second measurement parameter includes a second angle and a second distance.

The second angle is an angle of the third device in the aligned second coordinate system measured by the second device. Directions of three coordinate axes of the aligned second coordinate system are the same as directions of the three coordinate axes of the first coordinate system. The second distance is a distance of the third device relative to the origin of coordinates of the aligned second coordinate system measured by the second device, and the second distance is represented by using the aligned second coordinate system.

Optionally, the second distance is represented as d2, and the second angle is represented as $\theta 2$.

Figure 7A:
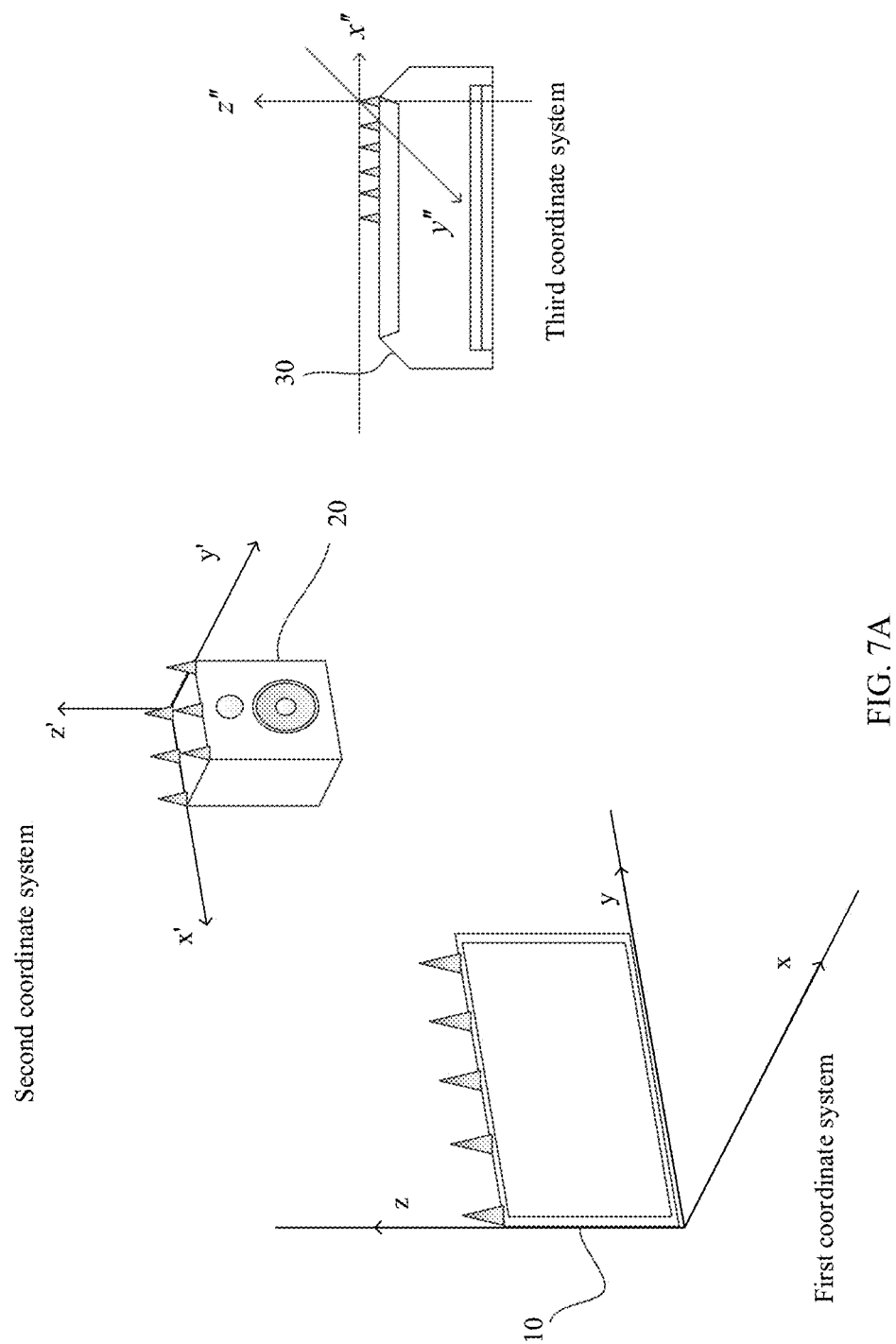
FIG. 7A is a schematic diagram including a third coordinate system according to an embodiment of this application.
Figure 7B:
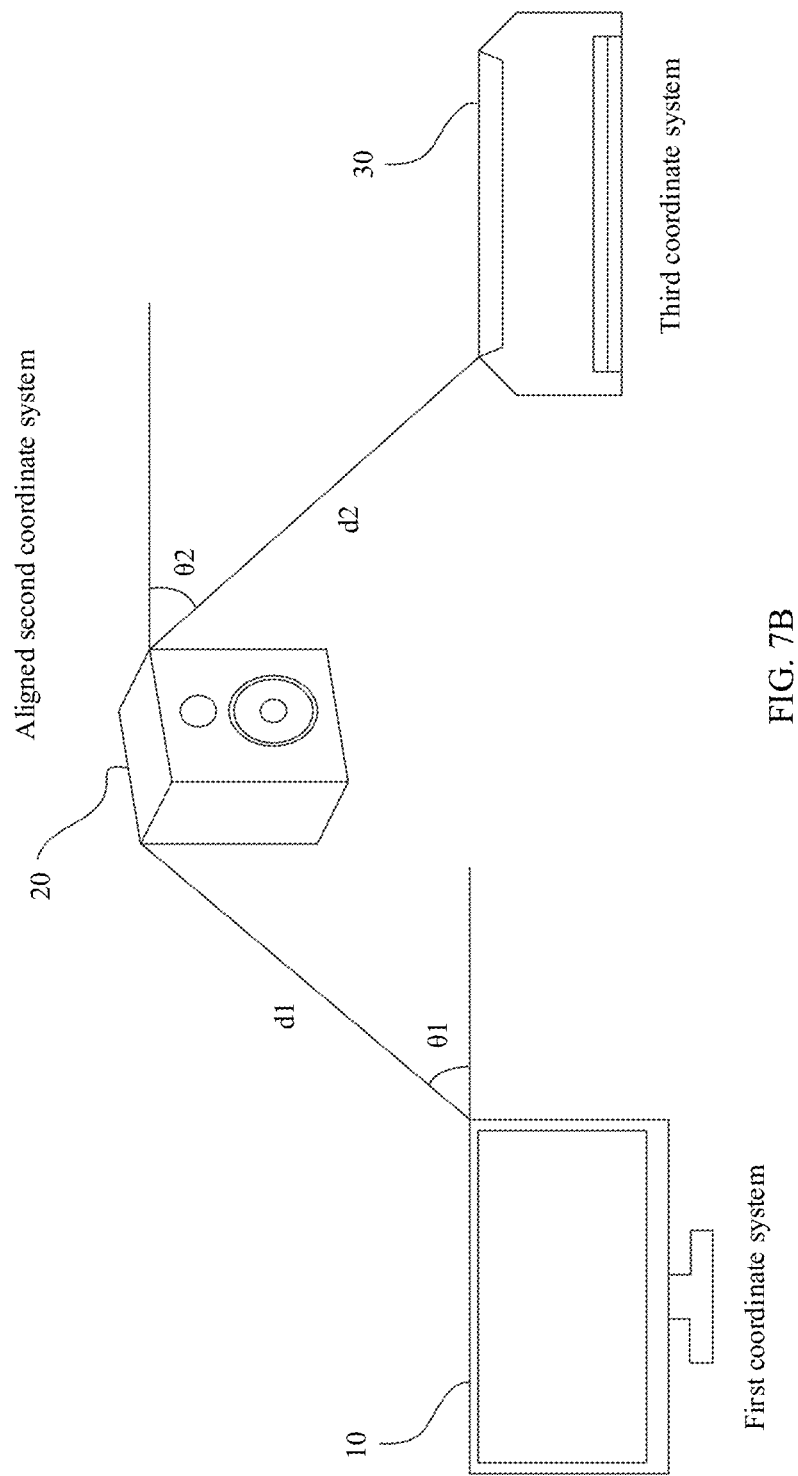
FIG. 7B is a schematic diagram of a position relationship between a TV, a sound box, and an air conditioner device according to an embodiment of this application.

As shown in FIG. 7A, for the third device, for example, an air conditioner 30, a coordinate system established by using a geometric structure of the air conditioner 30 is a third coordinate system. Three coordinate axes of the third coordinate system are respectively represented as x", y", and z". As shown in FIG. 7B, by using the aligned second coordinate system, the second device measures the second angle as $\theta 2$ and the second distance as d2.

Optionally, before θ2 and d2 are obtained through measurement by using the aligned second coordinate system, the method further includes the following. The positioning server obtains the aligned second coordinate system. That is, the second coordinate system is aligned with the first coordinate system, and then the aligned second coordinate system is sent to the positioning server. Alternatively, it may also be that the second device sends required information, such as the first angle and a third angle, to the positioning server, and the positioning server obtains the aligned second coordinate system through calculation based on the information.

In this embodiment, an example in which the positioning server obtains the aligned second coordinate system through calculation based on the information reported by the second device is used for description. Further, obtaining the aligned second coordinate system includes the following steps.

Step 1: Obtain the first angle and the third angle.

The third angle is an angle of the first device in the second coordinate system. Further, the third angle is an angle of the antenna array of the first device in the second coordinate system measured by the second device. Optionally, the third angle is represented as θ3.

Figure 8A:
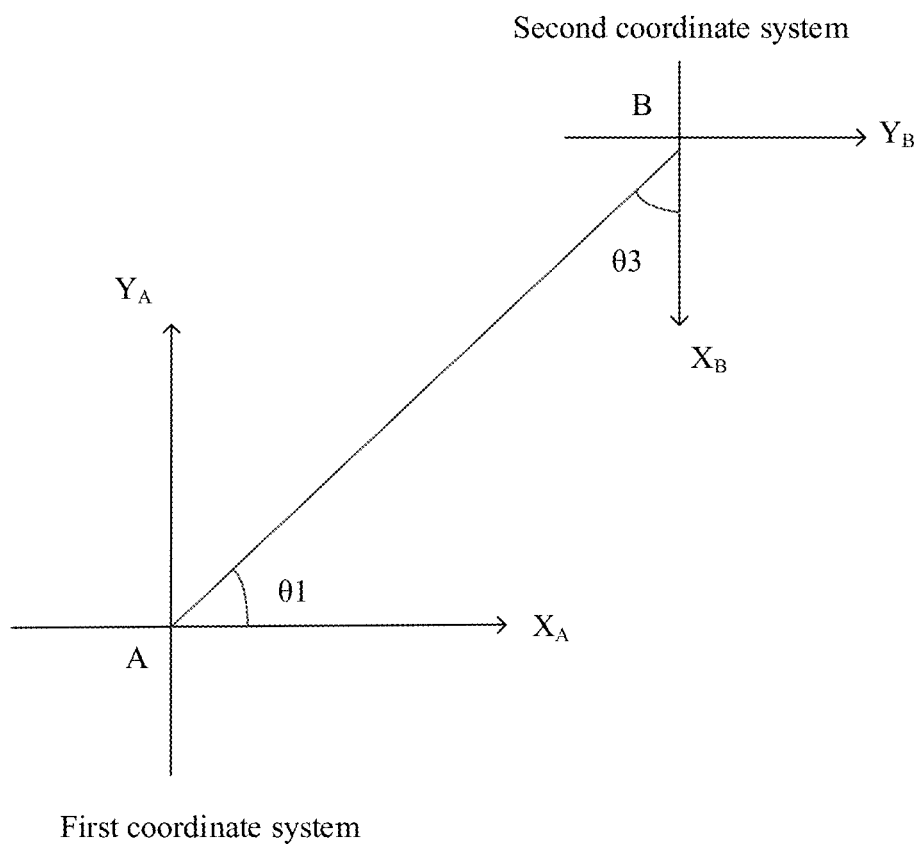
FIG. 8A is a schematic diagram of a second coordinate system before alignment according to an embodiment of this application.

As shown in FIG. 8A, it is assumed that the origin of coordinates of the coordinate system corresponding to the first device is A, and the origin of coordinates of the coordinate system corresponding to the second device is B. The first coordinate system may be represented by using coordinate axes $X_A$, $Y_A$, and $Z_A$, the second coordinate system is represented by using coordinate axes $X_B$, $Y_B$, and $Z_B$, and it is satisfied that $Z_A//Z_B$ and $X_AY_A//X_BY_B$, that is, $Z_A$ is parallel to $Z_B$ (the z-axis is not shown in FIG. 8A), and an $X_AY_A$ plane is parallel to an $X_BY_B$ plane. A geometry of a home appliance device usually includes a horizontal plane (for example, the top of a sound box or the top of a TV), and the horizontal plane is parallel to an earth plane. Therefore, establishing an x-axis and a y-axis based on the horizontal plane of each home appliance device can ensure that a horizontal plane of the first coordinate system is parallel to a horizontal plane of the second coordinate system.

Step 2: Determine a target angle based on the first angle and the third angle. The target angle is represented as δ.

Further, a determining manner is δ1=θ1−θ3−180°. For example, as shown in FIG. 8A, θ1=45° and θ3=−45°, and therefore δ1=45°−(−45°)−180°=−90°.

Alternatively, another determining manner is δ1=θ1−θ3−180°, for example, δ2=(−45°−45°−180°=−270°.

Step 3: Rotate a plane that includes the x-axis and the y-axis of the second coordinate system by the target angle in a horizontal direction to obtain the aligned second coordinate system.

Figure 8B:
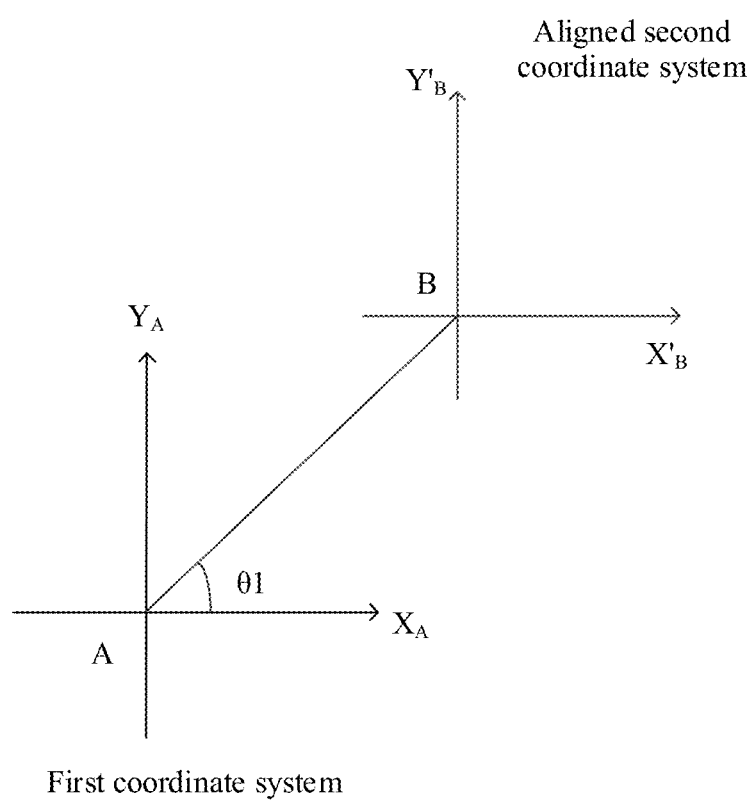
FIG. 8B is a schematic diagram of an aligned second coordinate system according to an embodiment of this application.

For example, as shown in FIG. 8B, after a plane that includes the $X_B$-axis and the $Y_B$-axis of the second coordinate system is rotated by the target angle δ1 clockwise, the aligned second coordinate system is obtained, for example, a coordinate system that is obtained after the second coordinate system is rotated by −90° clockwise, that is, rotated by 90° counterclockwise. Directions of an $X'_B$-axis and a $Y'_B$-axis obtained after conversion are consistent with directions of the $X_B$-axis and the $Y_B$-axis of the first coordinate system respectively.

Optionally, the coordinate axes of the first coordinate system may also be rotated so that the first coordinate system after rotation is aligned with the second coordinate system. For example, after a plane that includes the $X_A$-axis and the $Y_A$-axis of the first coordinate system is rotated by the target angle δ2 counterclockwise, that is, rotated by 270° counterclockwise, directions of an $X'_A$-axis and a $Y'_A$-axis of a coordinate system obtained are consistent with directions of the $X_B$-axis and the $Y_B$-axis of the second coordinate system respectively.

Figure 9A:
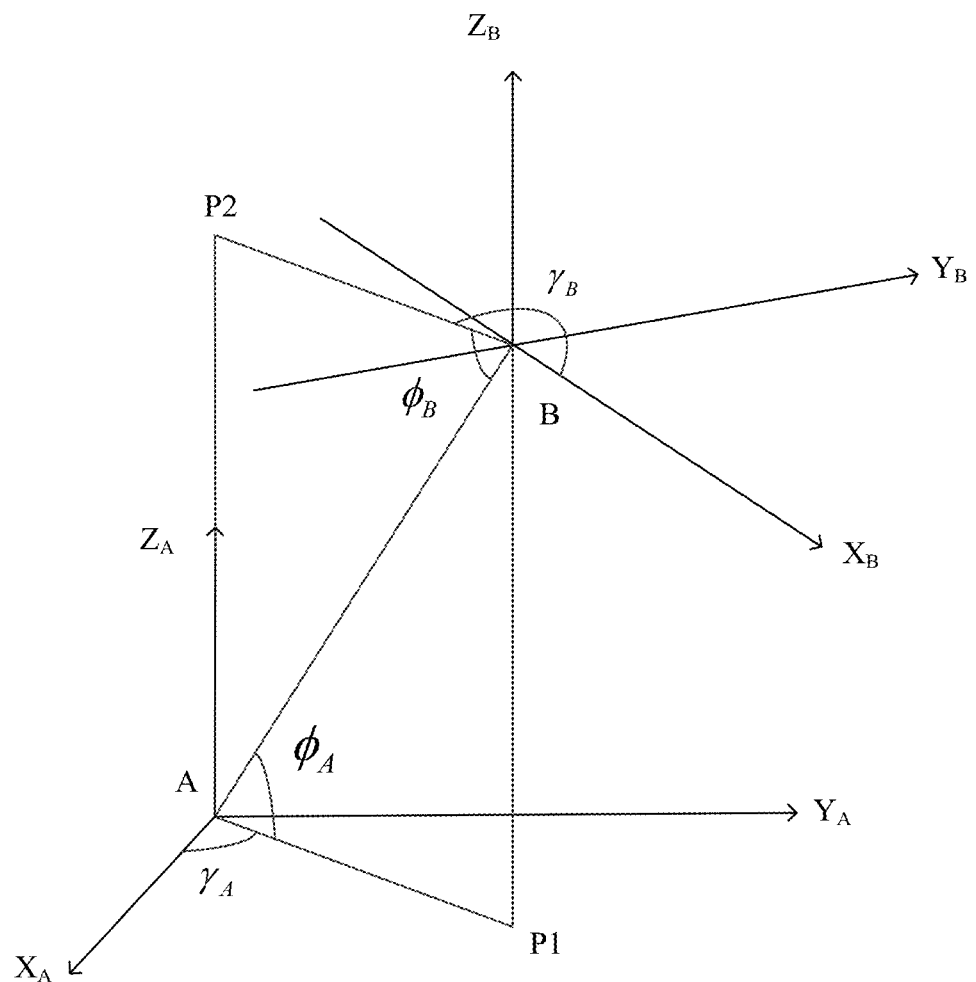
FIG. 9A is a schematic diagram of a structure of a second coordinate system before alignment in a 3D scenario according to an embodiment of this application.

In addition, in a 3D scenario, the first angle and the third angle may be represented by using a measured azimuth γ. For example, as shown in FIG. 9A, the first angle is an azimuth $γ_A$. The azimuth $γ_A$ is an angle between a projection P1 of the origin of coordinates B of the second device on the horizontal plane (the plane that includes the $X_A$-axis and the $Y_A$-axis) of the first coordinate system and the direction of the $X_A$-axis. The third angle is an azimuth $γ_B$. The azimuth $γ_B$ is an angle between a projection P2 of the origin of coordinates A of the first device on the horizontal plane (the plane that includes the $X_B$-axis and the $Y_B$-axis) of the second coordinate system and the direction of the $X_B$-axis. In FIG. 9A, $φ_A$ and $φ_B$ are pitch angles. Further, $φ_A$ is an angle between a line AB and the horizontal plane of the first coordinate system, and $φ_B$ is an angle between the line AB and the horizontal plane of the second coordinate system.

Figure 9B:
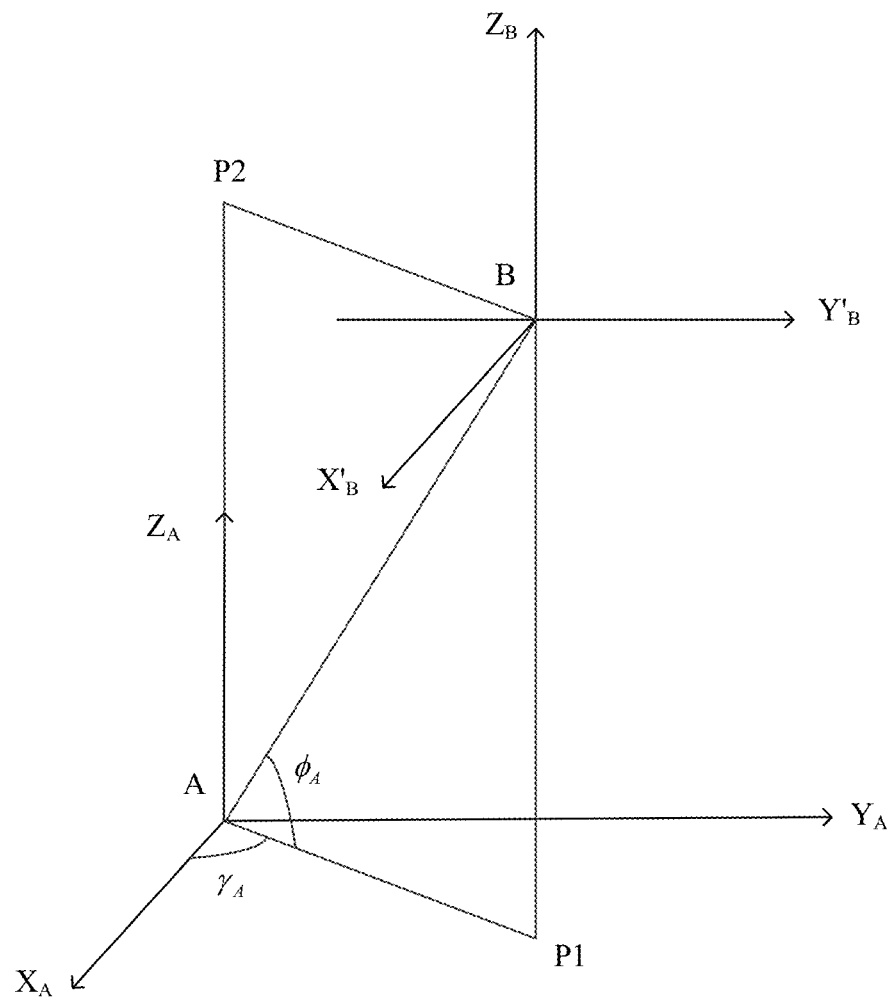
FIG. 9B is a schematic diagram of a structure of an aligned second coordinate system in a 3D scenario according to an embodiment of this application.

In "Step 2", the target angle is determined as δ1=$γ_A$−$γ_B$−180° based on the azimuths $γ_B$ and $γ_B$. Then in "Step 3", the plane of the second coordinate system is rotated by the target angle δ1 clockwise to obtain the aligned second coordinate system. As shown in FIG. 9A, $γ_A$=60° and $γ_B$=190°, and therefore the target angle is determined as δ=$γ_A$−$γ_B$−180°=60°−190°−180°=−310°. The plane that includes the $X_B$-axis and the $Y_B$-axis is rotated by 50° clockwise to obtain the aligned second coordinate system, and the $Z_B$-axis remains unchanged, as shown in FIG. 9B.

105: Determine a second spatial position of the third device in the aligned second coordinate system based on the second angle and the second distance.

For example, in FIG. 7B, the second distance d2 is a distance between the origin of coordinates of the coordinate system of the sound box 20 and an origin of coordinates of the coordinate system of the air conditioner 30, and the second angle θ2 is an angle of an antenna array of the air conditioner 30 measured by the sound box 20 by using the aligned second coordinate system, or may be considered as an angle of the air conditioner 30 in the aligned second coordinate system. The second spatial position of the air conditioner 30 in the aligned second coordinate system may be calculated based on the second distance d2 and the second angle θ2. A specific process is the same as step 102. Details are not described herein again.

106: Determine a third spatial position of the third device in the first coordinate system based on the second spatial position.

Because the coordinate axis directions of the aligned second coordinate system are consistent with the coordinate axis directions of the first coordinate system, the spatial position of the third device in the first coordinate system may be directly obtained. For example, a position of the air conditioner 30 in the aligned second coordinate system is (x2, y2), and because the position of the sound box 20 in the first coordinate system is (x1, y1), it is calculated that a position of the air conditioner 30 in the first coordinate system is (x1+x2, y1+y2). Then, the third spatial position of the air conditioner 30 in the first coordinate system is calculated with reference to the first distance d1 and the second distance d2.

The method further includes determining a spatial position of the third device in the geodetic coordinate system based on the third spatial position of the third device in the first coordinate system and the conversion relationship between the first coordinate system and the geodetic coordinate system. For an example process, refer to step 104. Details are not described herein again.

Figure 10:
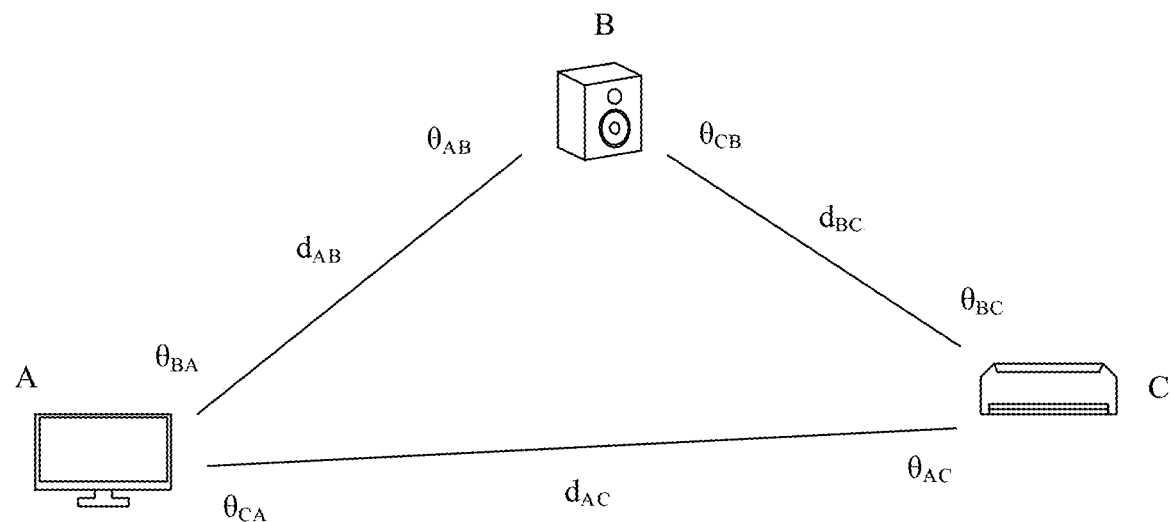
FIG. 10 is a schematic diagram of home appliance devices in an overdetermined system in a two-dimensional scenario according to an embodiment of this application.

In the foregoing position calculation process, for a positioning system that includes three or more devices, an overdetermined equation in an overdetermined system may be used to solve an unknown. A quantity of equations in an overdetermined equation group is greater than a quantity of unknowns. As shown in FIG. 10, the origin of coordinates A of the coordinate system of the TV, the origin of coordinates B of the coordinate system of the sound box, and the origin of coordinates C of the coordinate system of the air conditioner are included, where a quantity of obtained measurement parameters is greater than a quantity of unknowns. Further, in addition to measurement values ($\theta_{BA}$, $d_{AB}$, and $\theta_{AB}$) between the TV and the sound box, as well as measurement values ($\theta_{CB}$, $d_{BC}$, and $\theta_{BC}$) between the sound box and the air conditioner, measurement values ($\theta_{CA}$, $d_{AC}$, and $\theta_{AC}$) between the TV and the air conditioner are also included, with a total of nine measurement parameters. When spatial positions and orientations of an antenna array at B of the sound box and an antenna array at C of the air conditioner in the coordinate system of the TV are separately calculated, an overdetermined equation group may be used for a solution. The coordinate system of the TV serves as a basic coordinate system, and spatial positions and orientations of the other devices in the basic coordinate system are calculated by using the least square method. Finally, the spatial positions of the sound box and the air conditioner in the geodetic coordinate system are obtained by using the conversion relationship between the coordinate system of the TV and the geodetic coordinate system.

In the method, the positioning server may obtain a relative orientation and a target angle of one device in a coordinate system of another device through angle measurement performed by the devices on each other, align the coordinate system of the other device based on the target angle, and then measure an angle and a distance of another device by using the aligned coordinate system. Then, a spatial position of the other device in a basic coordinate system is obtained. Finally, a spatial position of the other home appliance device in the geodetic coordinate system is accurately located by using a conversion relationship between the basic coordinate system and the geodetic coordinate system. In this way, the following problem is avoided. A direction and an orientation of an anchor change due to manual setup of the anchor and artificial reasons, thereby affecting positioning accuracy.

In this embodiment, the first coordinate system in which the TV is located serves as the basic coordinate system. A spatial position and an orientation of the sound box are first calculated based on the first coordinate system. Then, the second coordinate system established based on the sound box is aligned with the basic coordinate system. By using the aligned second coordinate system as a coordinate system of an intermediate home appliance, a spatial position of the air conditioner device is measured. In this way, the spatial position of the air conditioner device in the basic coordinate system is accurately located by using a relationship between the aligned second coordinate system and the basic coordinate system.

In addition, a positioning system may periodically obtain a measurement parameter reported by each device, such as an angle and a distance, thus obtain a latest relative orientation and a latest relative position of each device regarding another device, and then convert the latest relative orientation and the latest relative position into an orientation and a position in the geodetic coordinate system. In this way, accurate positioning and orientation maintenance are implemented for each indoor device.

The method further includes the following. The positioning server obtains a spatial position of the first device in the geodetic coordinate system based on the conversion relationship between the first coordinate system and the geodetic coordinate system, performs positioning on a mobile target based on the spatial positions of the first device, the second device, and the third device in the geodetic coordinate system, calculates information about a position of the mobile target by analyzing attributes of a radio signal between each device and the mobile target, and obtains a spatial position of the mobile target in the geodetic coordinate system.

The attributes of a radio signal include time of flight (TOF), an AoA, an angle of departure (AoD), an RSSI, and the like that are of the signal.

Figure 11A:
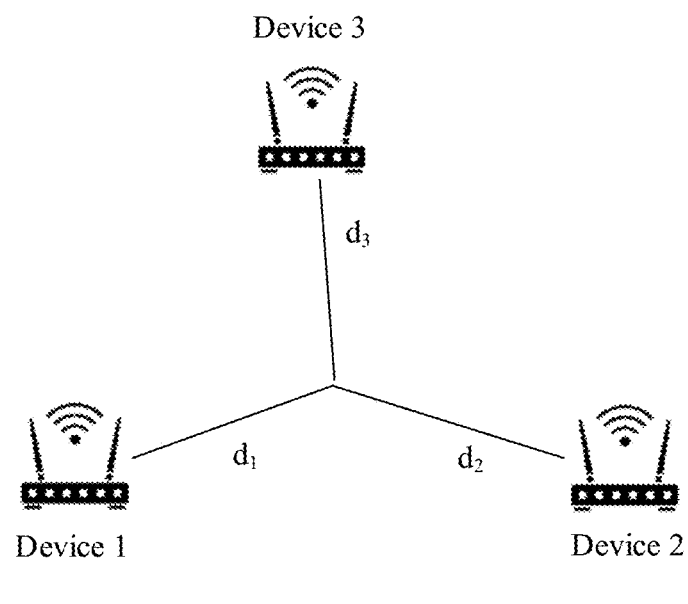
FIG. 11A is a schematic diagram of positioning through trilateration according to an embodiment of this application.
Figure 11B:
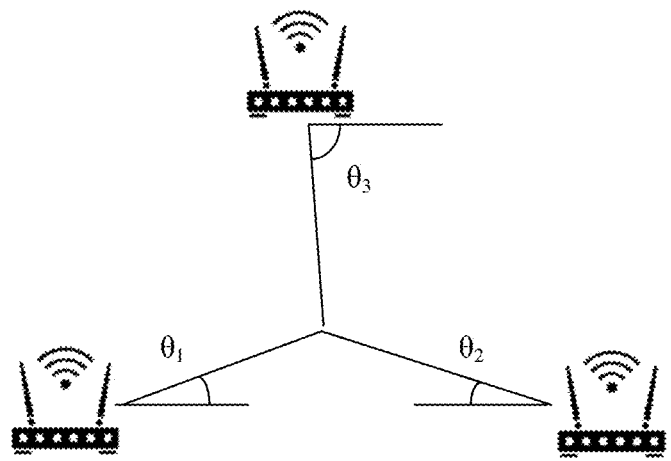
FIG. 11B is a schematic diagram of positioning through triangulation according to an embodiment of this application.
Figure 11C:
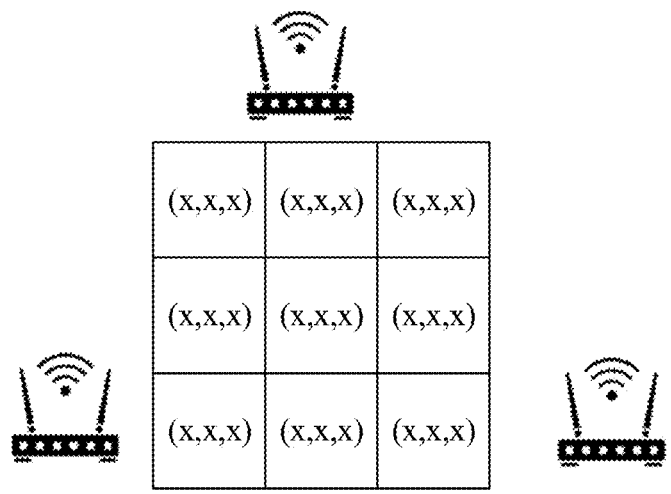
FIG. 11C is a schematic diagram of positioning through received signal strength indicator (RSSI)-based fingerprinting according to an embodiment of this application.

Correspondingly, as shown in FIG. 11A to FIG. 11C, by using these attributes of a radio signal, the positioning server may perform positioning on the mobile target through trilateration, triangulation, RSSI-based fingerprinting, and the like. A specific positioning process is not described in detail in this embodiment.

Optionally, each coordinate system of the first device, the second device, and the third device above is displayed by using a three-dimensional model diagram, for example, FIG. 3A, FIG. 3B, FIG. 5A, FIG. 5B, and FIG. 7A to FIG. 10. In addition, the position of the mobile target calculated by the indoor positioning system may also be displayed in the three-dimensional model diagram, thereby providing a visual interface for a user, facilitating the user in obtaining various information provided by the positioning system, and speeding up positioning calculation.

The following describes an apparatus embodiment corresponding to the foregoing method embodiment.

Figure 12:
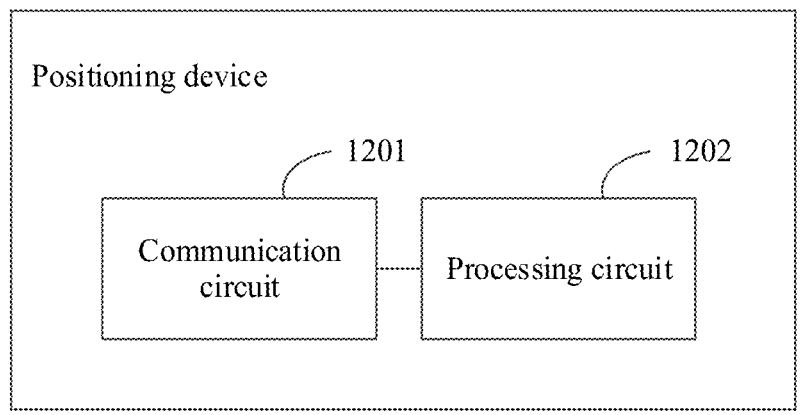
FIG. 12 is a schematic diagram of a structure of a positioning device according to an embodiment of this application.

FIG. 12 is a schematic diagram of a structure of an indoor positioning device according to an embodiment of this application. The device may be the positioning server in the foregoing embodiment, or may be a positioning chip located in the positioning server.

Further, as shown in FIG. 12, the device may include a communication circuit 1201 and a processing circuit 1202. In addition, the device may further include another unit or module such as a storage unit, which is not limited in this embodiment.

The communication circuit 1201 is configured to receive a first measurement parameter sent by a first device. The first measurement parameter is obtained after the first device measures a second device in a first coordinate system. The first measurement parameter includes a first angle and a first distance, where the first angle is an angle of the second device in the first coordinate system, and the first distance is a distance of the second device relative to an origin of coordinates.

The processing circuit 1202 is configured to determine a first spatial position of the second device in the first coordinate system based on the first angle and the first distance, and determine a spatial position of the second device in a geodetic coordinate system based on the first spatial position and a conversion relationship between the first coordinate system and the geodetic coordinate system.

A geometric structure of the first device includes a length, a width, and a height of the first device, and coordinate axes are established for the first coordinate system based on the length, the width, and the height of the first device. In addition, the first angle is an angle of an antenna array of the second device measured by the first device in the first coordinate system.

Optionally, in an example implementation of this embodiment, the communication circuit 1201 is further configured to receive a second measurement parameter sent by the second device, where the second measurement parameter is obtained by the second device by measuring a third device in the aligned second coordinate system. The second measurement parameter includes a second angle and a second distance, where the second angle is an angle of the third device in the aligned second coordinate system, coordinate axis directions of the aligned second coordinate system are consistent with coordinate axis directions of the first coordinate system, and the second distance is a distance of the third device relative to an origin of coordinates of the aligned second coordinate system.

The processing circuit 1202 is further configured to calculate a second spatial position of the third device in the aligned second coordinate system based on the second angle and the second distance, and determine a third spatial position of the third device in the first coordinate system based on the second spatial position.

Optionally, in another example implementation of this embodiment, the processing circuit 1202 is further configured to, before the communication circuit 1201 receives the second measurement parameter sent by the second device, obtain the first angle and a third angle, determine a target angle based on the first angle and the third angle, and rotate a first plane that includes an x-axis and a y-axis of the second coordinate system by the target angle in a horizontal direction to obtain the aligned second coordinate system, where the third angle is an angle of the first device in the second coordinate system. The second coordinate system is a coordinate system established based on an antenna, used as the origin of coordinates, in an antenna array of the second device and a geometric structure of the second device.

Further, the processing circuit 1202 is further configured to determine the target angle based on a first relational expression, where the first relational expression is $\delta 1 = \theta 1 - \theta 3 - 180°$, $\delta$ is the target angle, $\theta 1$ is the first angle, and $\theta 3$ is the third angle.

Optionally, in still another example implementation of this embodiment, the processing circuit 1202 is further configured to determine a spatial position of the third device in the geodetic coordinate system based on the third spatial position of the third device in the first coordinate system and the conversion relationship between the first coordinate system and the geodetic coordinate system.

In addition, the processing circuit 1202 is further configured to obtain a spatial position of the first device in the geodetic coordinate system based on the conversion relationship between the first coordinate system and the geodetic coordinate system, and perform positioning on a mobile target by using the spatial positions of the first device, the second device, and the third device in the geodetic coordinate system, and obtain a spatial position of the mobile target in the geodetic coordinate system.

In addition, in hardware implementation, an embodiment of this application further provides a communication device. The communication device may be the positioning server in the foregoing embodiment, or a device integrated with the foregoing anchor position determining apparatus.

Figure 13:
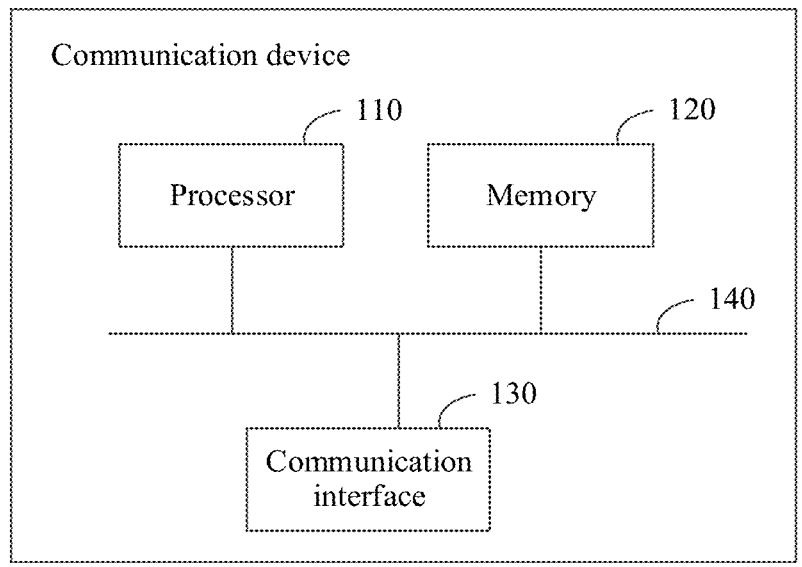
FIG. 13 is a schematic diagram of a structure of a communication device according to an embodiment of this application.

FIG. 13 is a schematic diagram of a structure of a communication device. The communication device may include a processor 110, a memory 120, and at least one communication interface 130, where the processor 110, the memory 120, and the at least one communication interface 130 are coupled by using a communication bus 140.

The processor 110 is a control center of the communication device, and may be used for communication between devices, including receiving and sending a measurement parameter, performing conversion between coordinate systems, performing positioning and calculation on a position of a device, and the like.

The processor 110 may include an integrated circuit (IC), for example, may include a single packaged IC, or may include a plurality of packaged ICs that are connected and that provide a same function or different functions. For example, the processor 110 may include a CPU, a digital signal processor (DSP), or the like.

In addition, the processor 110 may further include a hardware chip, where the hardware chip may be an application-specific integrated circuit (ASIC), a programmable logic device (PLD), or a combination thereof. The PLD may be a complex PLD (CPLD), a field-programmable gate array (FPGA), a generic array logic (GAL), or any combination thereof. Optionally, the hardware chip is a processing chip.

In addition, the processor 110 further includes an antenna array, where the antenna array includes at least one antenna.

Optionally, the processor 110 is integrated into a PCB board, where the PCB board includes the processing chip and the antenna array.

The memory 120 is configured to store and exchange various types of data or software, including storing a first measurement parameter, a second measurement parameter, a first coordinate system, a second coordinate system, a third coordinate system, and the like. In addition, the memory 120 may store a computer program or code.

Further, the memory 120 may include a volatile memory, for example, a random-access memory (RAM), and may further include a non-volatile memory, for example, a flash memory, a hard disk drive (HDD), or a solid-state drive (SSD). The memory 120 may further include a combination of the foregoing types of memories.

The communication interface 130 uses any apparatus such as a transceiver, and is configured to communicate with another device or a communication network, such as an Ethernet, a radio access network (RAN), a wireless local area network (WLAN), or a Virtual eXtensible local area network (VXLAN). For example, the communication interface 130 is used to receive the first measurement parameter, the second measurement parameter, and other information reported by each anchor.

It should be understood that the communication device may further include more or fewer other components. The structure illustrated in this embodiment of this application does not constitute a specific limitation on the communication device. In addition, the components shown in FIG. 13 may be implemented by using hardware, software, firmware, or any combination thereof.

When software is used to implement the embodiments, all or a part of the embodiments may be implemented in a form of a computer program product. For example, the communication circuit 1201 in the indoor positioning device shown in FIG. 12 may be implemented by using the communication interface 130, a function of the processing circuit 1202 may be implemented by the processor 110, and a function of the storage unit may be implemented by the memory 120.

In addition, the communication device further includes a mobile communication module, a wireless communication module, and the like. The mobile communication module includes a module that has a wireless communication function such as 2G, 3G, 4G, and 5G. In addition, the mobile communication module may further include a filter, a switch, a power amplifier, a low-noise amplifier (LNA), and the like. The wireless communication module may provide a wireless communication solution that is applied to a network device and that includes a WLAN, BLUETOOTH, a global navigation satellite system (GNSS), frequency modulation (FM), and the like.

In addition, an embodiment of this application further provides a wireless positioning system. The system includes at least one network device and at least one home appliance device. The network device may be the communication device shown in FIG. 13, for example, a positioning server. A structure of the network device may be the same as a structure of the device shown in FIG. 13, and is configured to implement the positioning method in the foregoing embodiments.

The home appliance device may be the first device, the second device, or the third device in the foregoing embodiments. A structure of the home appliance device may be the same as or may be different from the structure of the communication device shown in FIG. 13. The structure and a specific form of the home appliance device are not limited in this embodiment.

Figure 14:
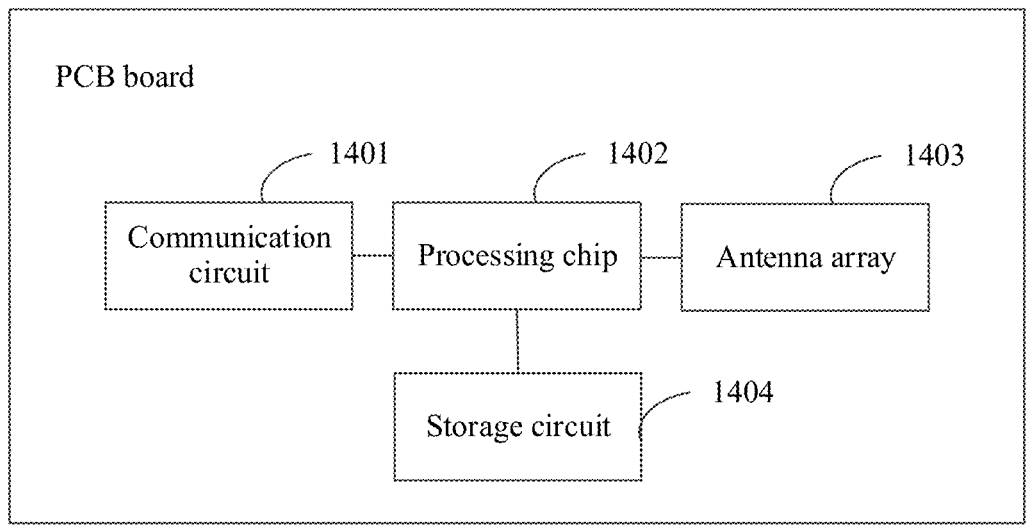
FIG. 14 is a schematic diagram of a structure of a PCB board according to an embodiment of this application.

For each home appliance device, a possible structure is shown in FIG. 14, including a PCB board, where the PCB board includes a communication circuit 1401, a processing chip 1402, an antenna array 1403, and a storage circuit 1404. A function of the communication circuit 1401 is the same as a function of a communication module in each anchor described above. The processing chip 1402 also includes a function of a processing module in each anchor described above, for example, including obtaining a first measurement parameter, a second measurement parameter, and the like, and sending the first measurement parameter or the second measurement parameter to a positioning server through the communication circuit 1401. The storage circuit 1404 is configured to store the first measurement parameter, the second measurement parameter, a first coordinate system, a second coordinate system, or the like.

Optionally, the processing chip 1402 is further configured to obtain a first angle and a third angle, determine a target angle based on the first angle and the third angle, and rotate a first plane of the second coordinate system by the target angle in a horizontal direction to obtain the aligned second coordinate system. The first plane includes an x-axis and a y-axis of the second coordinate system.

A manner of connection between the communication circuit 1401, the processing chip 1402, the antenna array 1403, and the storage circuit 1404 in the PCB board is not limited in this embodiment.

This embodiment proposes a design solution in which a home appliance device is used as an anchor deployment platform. Compared with a conventional anchor deployment manner, this design solution allows a processing module of an anchor to be integrated into a processor or a processing chip of a home appliance device. No additional deployment space is required, and no additional power supply is required either due to power supply by the home appliance device, thereby reducing anchor deployment costs and removing obstacles for wide application of an indoor positioning system in smart homes.

An embodiment of this application further provides a computer program product. The computer program product includes one or more computer program instructions. When the computer program instructions are loaded and executed on a computer, the procedure or functions according to embodiments are all or partially generated. The computer may be a general-purpose computer, a dedicated computer, a computer network, or other programmable apparatuses.

The computer program instructions may be stored in a computer readable storage medium or transmitted from one computer readable storage medium to another computer readable storage medium. For example, the computer instructions may be transmitted from one communication device, computer, server, or data center to another communication device in a wired or wireless manner.

The computer program product and the computer program instructions may be located in the memory 120 of the foregoing communication device, or may be located in a storage circuit in a PCB board of each home appliance device, to implement the indoor positioning method described in the embodiments of this application.

In addition, in the descriptions of the embodiments of this application, "at least one" means one or more. In addition, to clearly describe the technical solutions in embodiments of this application, words such as "first" and "second" are used in embodiments of this application to distinguish between same items or similar items that have basically the same functions or purposes. Persons skilled in the art may understand that the terms such as "first", "second", and "third" do not limit a quantity or an execution sequence, and the terms such as "first" and "second" do not indicate a definite difference.

The foregoing embodiments of this application do not constitute a limitation on the protection scope of this application.

What is claimed is:

1. An indoor positioning method comprising:
receiving, from a first device, a first measurement parameter of a second device in a first coordinate system, wherein the first coordinate system is based on a first antenna that is used as a first origin of coordinates and in a first antenna array of the first device, wherein the first measurement parameter comprises a first angle of the second device in the first coordinate system and a first distance of the second device relative to the first origin of coordinates, wherein the first coordinate system comprises coordinate axes based on a length of the first antenna, a width of the first antenna, and a height of the first antenna; and wherein the first angle is of a second antenna array of the second device and is based on measurement in the first coordinate system;
determining a first spatial position of the second device in the first coordinate system based on the first angle and the first distance; and
determining a second spatial position of the second device in a geodetic coordinate system based on the first spatial position and a conversion relationship between the first coordinate system and the geodetic coordinate system.

2. The indoor positioning method of claim 1, further comprising:
receiving a second measurement parameter from the second device by measuring a third device in an aligned second coordinate system, wherein first coordinate axis directions of the aligned second coordinate system are consistent with second coordinate axis directions of the first coordinate system, and wherein the second measurement parameter comprises a second angle of the third device in the aligned second coordinate system and a second distance of the third device relative to a second origin of coordinates of the aligned second coordinate system;

determining a third spatial position of the third device in the aligned second coordinate system based on the second angle and the second distance; and determining a fourth spatial position of the third device in the first coordinate system based on the third spatial position.

3. The indoor positioning method of claim 2, wherein before receiving the second measurement parameter, the indoor positioning method further comprises:

obtaining a third angle of the first device in a second coordinate system, wherein the second coordinate system based on a second antenna that is used as the second origin of coordinates and in the second antenna array of the second device;

determining a target angle based on the first angle and the third angle; and rotating a first plane of the second coordinate system by the target angle in a horizontal direction to obtain the aligned second coordinate system, wherein the first plane comprises an x-axis of the second coordinate system and a y-axis of the second coordinate system.

4. The indoor positioning method of claim 3, wherein determining the target angle comprises determining the target angle based on a first relational expression, and wherein the first relational expression is:

$$\delta1=\theta1-\theta3-180°,$$

wherein $\delta1$ is the target angle, wherein $\theta1$ is the first angle, and wherein $\theta3$ is the third angle.

5. The indoor positioning method of claim 2, further comprising determining a fifth spatial position of the third device in the geodetic coordinate system based on the fourth spatial position and the conversion relationship.

6. The indoor positioning method of claim 5, further comprising:

obtaining a sixth spatial position of the first device in the geodetic coordinate system based on the conversion relationship;

performing positioning on a mobile target using the sixth spatial position, the second spatial position, and the fifth spatial position; and obtaining a seventh spatial position of the mobile target in the geodetic coordinate system.

7. The indoor positioning method of claim 1, further comprising receiving, from the first device, the first angle as an angle of an antenna array in the first coordinate system.

8. An indoor positioning device comprising:

a communication circuit configured to receive, from a first device, a first measurement parameter of a second device in a first coordinate system, wherein the first coordinate system is based on a first antenna that is used as a first origin of coordinates and in a first antenna array of the first device, wherein the first measurement parameter comprises a first angle of the second device in the first coordinate system and a first distance of the second device relative to the first origin of coordinates, wherein the first coordinate system comprises coordinate axes based on a length of the first antenna, a width of the first antenna, and a height of the first antenna; and wherein the first angle is of a second antenna array of the second device and is based on measurement in the first coordinate system; and a processing circuit coupled to the communication circuit and configured to:

determine a first spatial position of the second device in the first coordinate system based on the first angle and the first distance; and determine a second spatial position of the second device in a geodetic coordinate system based on the first spatial position and a conversion relationship between the first coordinate system and the geodetic coordinate system.

9. The indoor positioning device of claim 8, wherein the communication circuit is further configured to receive a second measurement parameter from the second device that is based on a third device in an aligned second coordinate system, wherein first coordinate axis directions of the aligned second coordinate system are consistent with second coordinate axis directions of the first coordinate system, wherein the second measurement parameter comprises a second angle of the third device in the aligned second coordinate system and a second distance of the third device relative to a second origin of coordinates of the aligned second coordinate system, and wherein the processing circuit is further configured to:

determine a third spatial position of the third device in the aligned second coordinate system based on the second angle and the second distance; and determine a fourth spatial position of the third device in the first coordinate system based on the third spatial position.

10. The indoor positioning device of claim 9, wherein before receiving the second measurement parameter, the processing circuit is further configured to:

obtain a third angle of the first device in a second coordinate system, wherein the second coordinate system is based on a second antenna that is used as the second origin of coordinates and in the second antenna array of the second device;

determine a target angle based on the first angle and the third angle; and rotate a first plane of the second coordinate system by the target angle in a horizontal direction to obtain the aligned second coordinate system, wherein the first plane comprises an x-axis of the second coordinate system and a y-axis of the second coordinate system.

11. The indoor positioning device of claim 10, wherein the processing circuit is further configured to determine the target angle based on a first relational expression, wherein the first relational expression is:

$$\delta1=\theta1-\theta3-180°,$$

wherein $\delta1$ is the target angle, wherein $\theta1$ is the first angle, and wherein $\theta3$ is the third angle.

12. The indoor positioning device of claim 9, wherein the processing circuit is further configured to determine a fifth spatial position of the third device in the geodetic coordinate system based on the fourth spatial position and the conversion relationship.

13. The indoor positioning device of claim 12, wherein the processing circuit is further configured to:

obtain a sixth spatial position of the first device in the geodetic coordinate system based on the conversion relationship;

perform positioning on a mobile target using the sixth spatial position, the second spatial position, and the fifth spatial position; and obtain a seventh spatial position of the mobile target in the geodetic coordinate system.

14. The indoor positioning device of claim 8, wherein the communication circuit is configured to receive, from the first device, the first angle as an angle of an antenna array in the first coordinate system.

15. A computer program product comprising computer-executable instructions that are stored on a non-transitory computer-readable storage medium and that, when executed by a processor, cause an indoor positioning device to:
  receive, from a first device, a first measurement parameter of a second device in a first coordinate system, wherein the first coordinate system is based on a first antenna that is used as a first origin of coordinates and in a first antenna array of the first device, and wherein the first measurement parameter comprises a first angle of the second device in the first coordinate system and a first distance of the second device relative to the first origin of coordinates, wherein the first coordinate system comprises coordinate axes based on a length of the first antenna, a width of the first antenna, and a height of the first antenna; and wherein the first angle is of a second antenna array of the second device and is based on measurement in the first coordinate system;
  determine a first spatial position of the second device in the first coordinate system based on the first angle and the first distance; and
  determine a second spatial position of the second device in a geodetic coordinate system based on the first spatial position and a conversion relationship between the first coordinate system and the geodetic coordinate system.

16. The computer program product of claim 15, wherein the computer-executable instructions further cause the indoor positioning device to:
  receive a second measurement parameter from the second device by measuring a third device in an aligned second coordinate system, wherein first coordinate axis directions of the aligned second coordinate system are consistent with second coordinate axis directions of the first coordinate system, and wherein the second measurement parameter comprises a second angle of the third device in the aligned second coordinate system and a second distance of the third device relative to a second origin of coordinates of the aligned second coordinate system;
  determine a third spatial position of the third device in the aligned second coordinate system based on the second angle and the second distance; and
  determine a fourth spatial position of the third device in the first coordinate system based on the third spatial position.

17. The computer program product of claim 16, wherein before receiving the second measurement parameter, the computer-executable instructions further cause the indoor positioning device to:
  obtain a third angle of the first device in a second coordinate system, wherein the second coordinate system is based on a second antenna that is used as the second origin of coordinates and in the second antenna array of the second device;
  determine a target angle based on the first angle and the third angle;
  rotate a first plane of the second coordinate system by the target angle in a horizontal direction to obtain the aligned second coordinate system, wherein the first plane comprises an x-axis of the second coordinate system and a y-axis of the second coordinate system.

18. The computer program product of claim 17, wherein the computer-executable instructions further cause the indoor positioning device to determine the target angle based on a first relational expression, and wherein the first relational expression is:

$$\delta 1 = \theta 1 - \theta 3 - 180°,$$

wherein $\delta 1$ is the target angle, wherein $\theta 1$ is the first angle, and wherein $\theta 3$ is the third angle.

19. The computer program product of claim 16, wherein the computer-executable instructions further cause the indoor positioning device to determine a fifth spatial position of the third device in the geodetic coordinate system based on the fourth spatial position and the conversion relationship.

20. The computer program product of claim 19, wherein the computer-executable instructions further cause the indoor positioning device to:
  obtain a sixth spatial position of the first device in the geodetic coordinate system based on the conversion relationship;
  perform positioning on a mobile target using the sixth spatial position, the second spatial position, and the fifth spatial position; and
  obtain a seventh spatial position of the mobile target in the geodetic coordinate system.

* * * * *